United States Patent Office 3,049,329
Patented Aug. 14, 1962

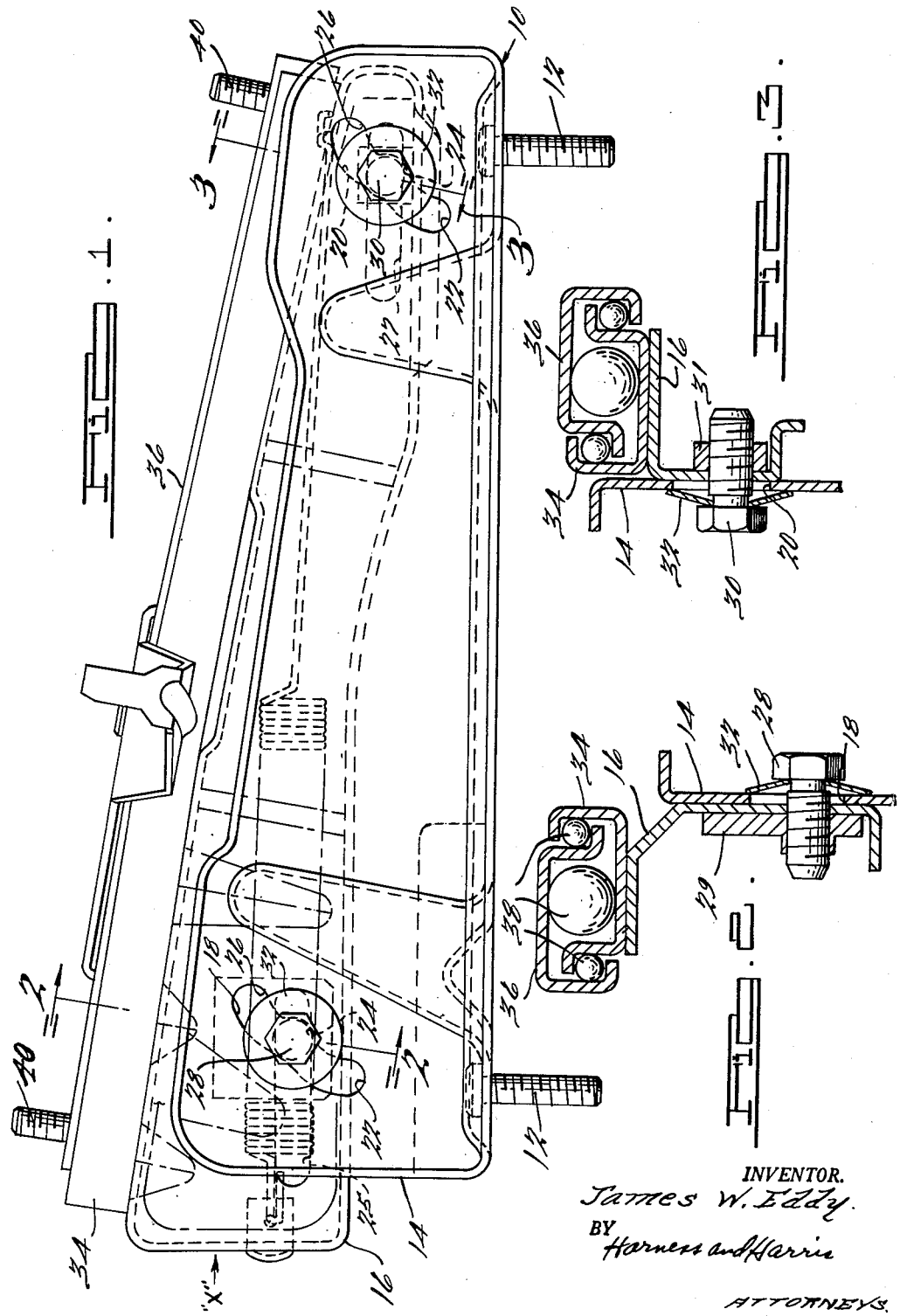

3,049,329
SEAT ADJUSTMENT
James W. Eddy, Royal Oak, Mich., assignor to Chrysler Corporation, Highland Park, Mich., a corporation of Delaware
Filed July 1, 1959, Ser. No. 824,365
4 Claims. (Cl. 248—394)

This invention relates to improvements in adjusting structure for two or more relatively movable members, such as the base and the support for seats.

In seating structures in general, it is desirable to provide some adjusting means for allowing vertical and horizontal adjustment of the seat relative to its base. The present invention utilizes a stepped slot or bearing surface at opposite ends of one of the relatively movable base or support members, and provides the other of these members with a stud or projection which rides in the groove or slot to the various step positions of the slot. These steps in the slot are of considerable importance in that they provide a substantially horizontal bearing means to support the downward thrust of the seat and thereby gives significantly greater support to the stud and its attached member than would the straight or curved slot without the steps. Moreover, in the conventional straight or curved slots of conventional adjusting structures without steps the bolt means which clamps the members in their adjusted positions cannot always maintain the members sufficiently tight against vibration to prevent slippage of the members out of their adjusted position.

It is a principal object of this invention to provide an improved type of slot or bearing means for seat adjusting structures which bearing means provides a plurality of adjusting positions.

Further objects and advantages of the present invention will become apparent from the following description and drawings, in which:

FIGURE 1 represents a side elevational view of a seat mounting structure;

FIGURE 2 represents a cross-sectional view of the mounting structure of FIGURE 1 taken along the line 2—2 thereof in the direction of the arrows;

FIGURE 3 represents a cross-sectional view of the mounting structure of FIGURE 1 taken along the line 3—3 thereof in the direction of the arrows.

Referring to the drawings, a seat base designated 10, one of which is located at each end of the seat, is provided with stud means 12 for securing the base 10 to the floor of a vehicle or other structure. A wall 14 of the base 10 carries a seat support 16 provided adjacent its ends with slots 18 and 20 having a clockwise angular displacement or inclination with respect to the vertical axis of the base and are provided with steps 22, 24, and 26, which represent substantially horizontally disposed bearing surfaces for carrying the downward load of the seat and the occupants. It is desirous that more of these bearing surfaces could be provided if further adjustments are necessary. The various portions of each slot are parallel to the same portion of the other slot so as to prevent binding of the studs 28 and 30 during the adjustment.

Studs 28 and 30 are inserted through slots 25 and 27 in member 16 and ride in the slots 18 and 20 respectively and when they are brought to rest on any one of the three aforesaid steps 22, 24, or 26, they are tightened into their respective nuts 29 and 31 against the force of the resilient washers 32, which washers exert sufficient resistance to movement of the side 14 and support 16 to facilitate proper adjustment of these parts when the bolts 28 and 30 are loosened for adjustment. The slots 18, 20, 25 and 27, and bolts 28 and 30, may be provided in either of the members 14 or 16 with equal effectiveness.

The supports 16 are secured in a conventional manner to the lower rail 34 of the conventional horizontal seat adjusting structure comprising said rail 34, an upper rail 36, and ball bearing means 38 interposed therebetween. The seat is secured in a conventional manner to the bolt means 40 secured to the upper rail 36. It is noted that the slant of the slots 18 and 20 with respect to the vertical axis is approximately forty-five degrees and allows a substantial portion of the seat lifting to occur during adjustment by pressure directed against the seat support 16 in the direction of the arrow designated "X" in FIGURE 1 when bolts 28 and 30 are bottomed respectively on the left end of slots 25 and 27 in support 16.

It is particularly noted that applicant's adjusting structure allows an individual adjustment of either the front bolt 28 or rear bolt 30 in the slots 18 and 20 respectively in base 10 without requiring any adjustment of the other one of said bolts due to the fact that each of the bolts 28 and 30 are slidable in slots 25 and 27 respectively in support 16 to allow the changes in distance between the pivot point of the non-adjusted one of the bolts 28 or 30 and the particular step 22, 24, or 26 to which the adjusted one of the bolts is moved. This type of adjusment is simply made by loosening the bolt to be adjusted and then pivoting the support 16 about the other still tightened bolt until a step is reached, and then retightening the adjusted bolt.

It is further noted that adjustment of the support 16 can be made to the right or left in FIGURE 1 with respect to base 10 by means of slots 25 and 27 in support 16 without any adjustments within stepped slots 18 and 20 in base 10.

I claim:

1. An adjustable support for a seating structure comprising a pair of substantially vertically disposed plates arranged in face-to-face relationship, the opposite ends of each of said pair of plates each having a slot therein with the pair of slots at each end of said pair of plates comprising an elongated substantially horizontally extending slot in one plate and a slot in the other plate intersecting the horizontally disposed slot and extending at an acute angle thereto, said acutely angled slot having a substantially stepped configuration to provide bolt seating notches at the upper and lower ends of the angled slot and at a location intermediate its ends so as to provide three vertically spaced seats for a horizontally disposed connector bolt extending through the pair of intersecting slots.

2. An adjustable support for a seating structure comprising a pair of substantially vertically disposed plates arranged in face-to-face relationship, the opposite ends of each of said pair of plates each having a slot therein with the pair of slots at each end of said pair of plates comprising an elongated substantially horizontally extending slot in one plate and a slot in the other plate intersecting the horizontally disposed slot and extending at an acute angle thereto, said acutely angled slot having a substantially stepped configuration to provide bolt seating notches at the upper and lower ends of the angled slot and at a location intermediate its ends so as to provide three vertically spaced seats for a horizontally disposed connector bolt extending through the pair of intersecting slots, the angled slots at the opposite ends of the plates being substantially parallel.

3. An adjustable support for a seating structure comprising a pair of substantially vertically disposed plates arranged in face-to-face relationship, the opposite ends of each of said pair of plates each having a slot therein with the pair of slots at each end of said pair of plates comprising an elongated substantially horizontally extending slot in one plate and a slot in the other plate intersecting the horizontally disposed slot and extending at an acute angle thereto, said acutely angled slot having a substantially stepped configuration to provide bolt seating notches at the upper and lower ends of the angled slot and at a location intermediate its ends so as to provide three vertically spaced seats for a horizontally disposed connector bolt extending through the pair of intersecting slots, said slots in each of said plates being continuous and of slightly greater width than the diameter of the associated connector bolt so that said bolt may be slidably shifted between the several seat portions and lengthwise of the horizontally disposed slots to readily provide for both vertical, horizontal and tilting adjustment between the pair of plates.

4. An adjustable support for a seating structure comprising a pair of substantially vertically disposed plates arranged in face-to-face relationship, the opposite ends of each of said pair of plates each having a slot therein with the pair of slots at each end of said pair of plates comprising an elongated substantially horizontally extending slot in one plate and a slot in the other plate intersecting the horizontally disposed slot and extending at an acute angle of approximately forty-five degrees to the horizontal, said acutely angled slot having a substantially stepped configuration to provide bolt seating notches at the upper and lower ends of the angled slot and at a location intermediate its ends so as to provide three vertically spaced seats for a horizontally disposed connector bolt extending through the pair of intersecting slots.

References Cited in the file of this patent

UNITED STATES PATENTS

| | | |
|---|---|---|
| 452,375 | Helmond | May 19, 1891 |
| 1,468,161 | Laystrom | Sept. 18, 1923 |
| 1,685,770 | Bowen | Oct. 2, 1928 |
| 2,025,436 | Brosset | Dec. 24, 1935 |
| 2,093,319 | Herold | Sept. 14, 1937 |
| 2,099,107 | Fleming | Nov. 16, 1937 |
| 2,134,135 | Lefevre | Oct. 25, 1938 |